United States Patent [19]
Ezard

[11] Patent Number: 4,653,242
[45] Date of Patent: Mar. 31, 1987

[54] MANUFACTURE OF WOODEN BEAMS

[75] Inventor: Francis I. Ezard, Victoria, Australia

[73] Assignee: Ezijoin Pty. Ltd., Melbourne, Australia

[21] Appl. No.: 705,337

[22] PCT Filed: May 25, 1984

[86] PCT No.: PCT/AU84/00095
§ 371 Date: Jan. 30, 1985
§ 102(e) Date: Jan. 30, 1985

[87] PCT Pub. No.: WO84/04787
PCT Pub. Date: Dec. 6, 1984

[30] Foreign Application Priority Data
May 30, 1983 [AU] Australia ................ PF9598

[51] Int. Cl.⁴ .................................... F16B 15/00
[52] U.S. Cl. .................................... 52/727; 52/696; 52/DIG. 6; 403/217
[58] Field of Search ............ 52/727, DIG. 6, 693, 52/696; 403/217

[56] References Cited
U.S. PATENT DOCUMENTS

| | | | |
|---|---|---|---|
| 1,373,036 | 3/1921 | Upson | 52/DIG. 6 |
| 3,309,833 | 3/1967 | Jureit | 52/727 X |
| 3,708,942 | 1/1973 | Leonard | 52/693 X |
| 4,241,557 | 12/1980 | Jensen | 52/DIG. 6 |
| 4,334,346 | 6/1982 | Jensen | 52/696 X |
| 4,501,102 | 2/1985 | Knowles | 52/693 X |

FOREIGN PATENT DOCUMENTS
291878 1/1966 Australia .

Primary Examiner—J. Karl Bell
Attorney, Agent, or Firm—Pollock, Vande Sande & Priddy

[57] ABSTRACT

A timber beam is formed of butt-joined timber lengths using at least one joining plate which extends around three sides of the abutted timber lengths. The joining plate has a base section and two side sections at least the side sections each having a plurality of projections extending therefrom. The base section has either additional projections or holes through which fasteners engage to secure the base section to co-planar surfaces of the abutting timber lengths. The joining plate is formed with the base and side sections coplanar with the side sections extending at an angle to the base section. A press plate forces the base section against the co-planar surfaces of the butting timber lengths with any projections extending therefrom embedded in the timber. Rollers or presses act on the side sections to bend them around the timber lengths to embed the projections extending therefrom into opposite sides of the abutted timber lengths.

7 Claims, 10 Drawing Figures

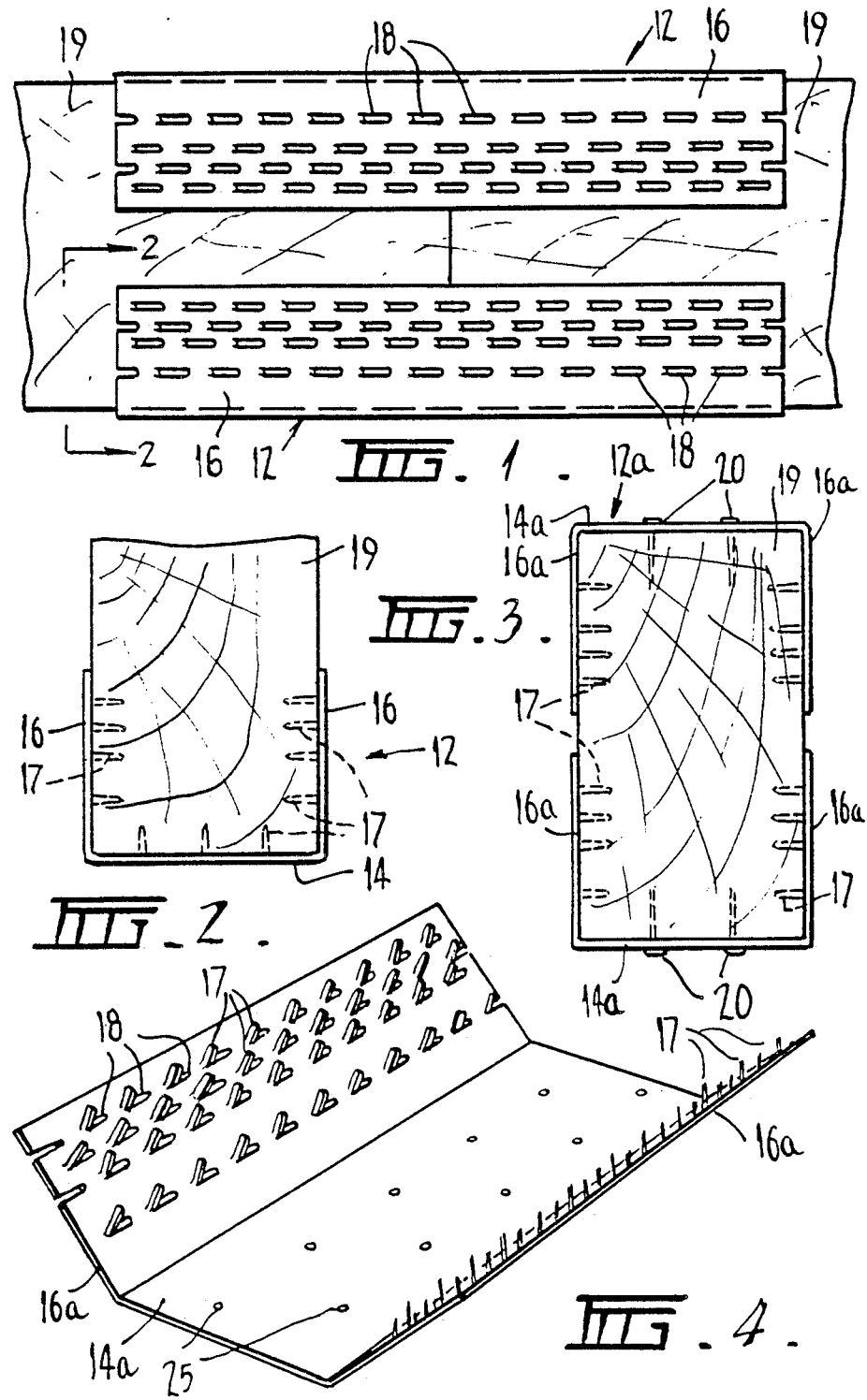

MANUFACTURE OF WOODEN BEAMS

BACKGROUND OF THE INVENTION

This invention relates to improvements in the manufacture of wooden beams and relates particularly to improved methods and apparatus for manufacturing wooden beams with butt-joined or spliced timber lengths.

In many applications in the building industry it is necessary to provide lengths of timber of substantial width and length in relation to thickness, such as for use as structural beams, floor joists, lintel beams, roof beams, rafters and the like.

With present day timber shortages and environmental control regulations, it is becoming increasingly difficult to obtain desired solid timber in wide sections and long lengths, and in particular in defect-free quality.

In the past it has been known to provide spliced beams by edge gluing two or more separate lengths of timber. It has also been known to butt-join timber lengths using known nail plates on either side of the lengths of timber to be joined and/or by machining interlocking formations, such as dovetail formations, in the ends of the timber lengths to be butt-jointed. Experience has shown that spliced beams and butt-joined beams formed by these known methods are unsatisfactory and uneconomic and such beams are generally usable only for substantially load-free applications.

BACKGROUND ART

U.S. Pat. Nos. 2,877,520, 3,011,226 and 3,016,586 and Australian Pat. No. 291,878 all disclose forms of structural wooden joints formed of timber members connected solely by metal plates having nail-like projections or teeth struck out from the plane of the plate and embedded in the timber members. Such plates are very effective in the manufacture of trusses and similar timber structures having several timber members extending in different directions and being interconnected with each other by the disclosed nail plates, which are limited to flat connectors.

U.S. Pat. No. 3,305,252 discloses another form of nail plate useful as a corner connector to be applied to two or three surfaces of a structure which intersect at an angle with respect to one another.

U.S. Pat. No. 3,365,222 discloses a wall brace having a U-shaped joist receiving member and a gussetted projection which is secured to a wall or the like. The joist receiving member has a number of inwardly extending teeth or fastening means which are driven or hammered into a joist to secure the joist relative to the wall or the like.

U.S. Pat. No. 3,427,055 discloses another form of plate connector for a corner joint having teeth of varying height to facilitate engagement of the teeth within the timber members forming the corner joint without distortion of the plate connector.

U.S. Pat. No. 4,318,628 discloses a device for assembling and connecting two or more construction elements, the device being formed with seats to receive the elements in the desired relationship, and one or more locking projections intended to penetrate into the elements. The projections extend from a bottom wall of each seat to engage and penetrate an end surface of the respective elements.

British Pat. No. 1579794 relates to a modified form of nail plate fastener particularly useful for joining angularly related timber members. The fastener comprises a bent plate having teeth struck from each portion, at least some of the teeth having an angularly extending shank portion and a tip portion which projects from the shank towards the plate portion. This type of projection enables the fastener to be located in position before the tip portions of each tooth are driven into the timber members being connected, the shank portion then lying in the plane of the respective plate portion. Teeth of this type are commonly referred to as "knuckle nails".

While the prior art forms of fasteners may be used for joining timber members to form corners, trusses and the like, it has been found that such fasteners are ineffective for butt-joining timber lengths to produce structurally sound beams as the strength of such beams is restricted by the holding power of the projections or teeth embedded in the timber sections.

It is therefore desirable to provide an improved fastener which is effective to produce structurally sound timber beams by butt joining or splicing timber lengths.

It is also desirable to provide improved methods and apparatus for producing spliced and/or butt-joined beams which are able to be used in load carrying applications.

It is also desirable to provide an improved method of forming a butt-joint between adjacent ends of lengths of timber which is economic and which results in a load carrying beam.

It is also desirable to provide methods and apparatus for producing spliced and/or butt-jointed beams which provide an alternative to solid timber beams of equivalent strength using more readily available component sections of better quality.

SUMMARY OF THE INVENTION

According to one aspect of the invention there is provided a joining plate for butt-joining adjacent ends of timber lengths comprising a U-shaped plate having a base section and opposed side sections, at least the side sections each having a plurality of projections struck therefrom and extending, in use, into the space defined by the base and side sections, said base section having projections struck therefrom and extending into said defined space and/or holes to receive driven fasteners, those portions of the base and side sections immediately adjacent the corners of the U-shaped plate being free of any projections and holes.

Preferably, the base section has projections struck therefrom and projecting, in use, into the defined space. The projections of both side sections and base section may be of the "knuckle nail" type or may be of the tooth type commonly employed in other known forms of nail plate type fasteners.

The joining plate of the invention is preferably formed with the base and side sections substantially co-planar although in a modified form, the side sections may extend at an angle to the base section. The base section is engaged with the timber lengths to be joined and the projections or driven fasteners are embedded into the timber lengths, which are maintained in end butted relationship. The side sections are then folded around the sides of the timber lengths and the projections struck from the side sections are embedded in the opposite sides of the timber lengths.

The butt-jointed timber lengths are thus firmly joined together with the joining plate engaging on three sides thereof, the projections or driven fasteners from the base section and the projections from the opposed side sections extending perpendicular to each other to interlock the joining plate to the timber sections.

The portions of the base and side sections immediately adjacent the corners of the U-shaped plate which are free of projections ana holes provide structural integrity and rigidity of the joint by providing areas along the corners which are not weakened by holes or struck projections. The strength of the joining plate is therefore enhanced by the rigid corner parts and resist tensile and shear forces transmitted to the joining plate through the projections and/or driven fasteners.

Preferably, the projections are struck from the side sections of the joining plate to extend at approximately 90 degrees to the plane of the respective side, although the projection angle may vary but preferably by not more than 5 degrees from the right angle. In a preferred form, the number of projections on each side section amount to no more than five (5) projections per square inch of section area.

According to another aspect of the invention there is provided a method of forming a butt-joint between adjacent ends of timber lengths using a joining plate of the type described above comprising the steps of supporting the timber lengths in end-butting relationship, supporting the joining plate with a base section thereof engaged with co-planar surfaces of said timber lengths, embedding either the projections extending from the base section or fasteners passing through holes in the base section into the abutted timber lengths and bending side sections of said joining plate about edges of the timber lengths to form said plate into a substantially U-shape with the projections extending from said side sections embedded in opposed sides of the timber lengths.

In one embodiment, said bending is performed by a rolling action using a forming roller which engages with the surface of one of the side sections opposite that surface from which the projections extend, the forming roller being moved in a direction perpendicular to the plane of the base section to roll the side section into engagement with the surface of the timber lengths. Preferably, a pair of forming rollers are used to simultaneously bend the side sections of the joining plate into engagement with the opposed side surfaces of the timber lengths.

In another engagement, for use particularly when the joining plate is formed with the side sections extending at an angle to the base section, the side sections are bent to engage the sides of the timber length by opposed presses acting on the side sections and compressing the sections and timber lengths therebetween to force the projections into the timber.

The invention also includes apparatus for carrying out the method and comprising means for supporting the timber lengths in end-abutting relationship, means for forcing a base section of a joining plate into close engagement with coplanar surfaces of said abutted timber lengths with projections or fasteners, extending from said base section firmly embedded in the timber lengths, and roller means adapted to engage with side sections of said joining plate and movable to force said side sections into engagement with opposed side surfaces of said timber lengths with projections extending from said side sections embedded in the timber lengths.

In the most preferred arrangements according to the invention, the butt-joined timber lengths are connected by a pair of joining plates the bases of which engage opposite sides of the timber lengths. The butt-jointed timber lengths can then be used in any orientation and under any loading situation.

The present invention also includes means for splicing together beams such as those produced as described above in edge-to-edge relationship comprising fastener elements of the corrugated strip type embedded in the adjacent timber lengths in such a fashion that the fastener elements may be embedded to an approximately equal extent in each of the timber lengths, the fastener element extending at an angle less than 80° or greater than 100° with respect to the plane of the engaged surfaces of the timber lengths, alternate fasteners, or alternate groups of fasteners extending at different angles.

Preferably, the fastener elements are formed of a strip of metal having at least the end portions thereof formed with corrugations. The central portion of the elements is preferably planar.

In order that the invention and its manner of performance may be more fully understood, reference will now be made to embodiments of the invention with reference to the accompanying drawings.

DESCRIPTION OF THE DRAWINGS

FIG. 1 is a side elevational view of butt-jointed timber lengths using a pair of joining plates of the present invention;

FIG. 2 is a view taken along the lines 2—2 of FIG. 1;

FIG. 3 is an end elevational view of a pair of joining plates connected to abutted timber lengths, the plates being of a modified form;

FIG. 4 is a perspective view of the modified form of joining plate before being engaged and secured to the abutted timber lengths;

DESCRIPTION OF THE PREFERRED EMBODIMENTS

Figures 5, 8:
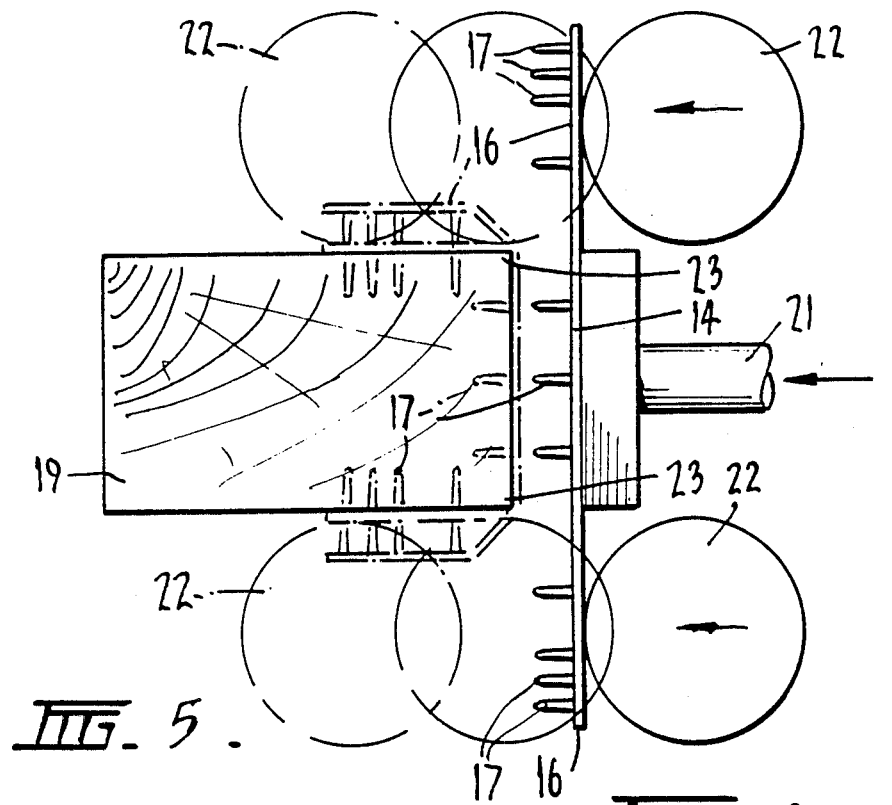
FIG. 5 is a view illustrating one method and apparatus for applying a joining plate to abutted end portions of timber lengths.
FIG. 8 is a side elevational view illustrating the means for splicing beams together.

Referring to FIGS. 1 and 2 of the drawings, the joining plate 12 of this embodiment comprises, in its operative form, a base section 14 and side sections 16. Each of the base and side sections 14 and 16 have a plurality of projections 17 extending from the respective planes of the sections 14 and 16 and which are preferably formed from the plate material by a stamping operation. The formation of the projections 17 thus produces the plurality of slots 18 shown in FIG. 1. As will be seen, the projections 17 extend substantially at right angles to the plane of the respective base and side sections 14 and 16, although deviations of up to 5° can occur.

With the joining plate 12 in operative engaged position on abutted end portions of two timber lengths 19, the projections 17 extending from the side sections 16 interlock with the projections 17 extending from the base section 14 to thereby securely fasten the joining plate 12 to the timber lengths 19. Any load applied to a timber beam formed of butt-joined sections in accordance with the invention gives rise to tensile and shear forces which are distributed evenly through the joining plate 12, the jointed timber sections acting very much as though the timber beam was of a single length. Naturally, the dimensions of the joining plate 12, the projections 17 and the timber lengths 19 should be selected to ensure proper engagement between the joining plate 12 and the timber lengths 19 to provide the necessary strength.

The joining plate 12 is shown in FIGS. 1 and 2 in operative engagement with the abutted timber lengths 19. The plate 12, however, will normally be constructed as a flat plate having the desired projections struck from the plate material. In one form, the flat plate is continuously formed from a roll of steel in coil form which is passed through a stamping machine to form the projections. The plate material may then either be re-coiled or cut to desired lengths. The projections 17 may be of any suitable form known in the art. Thus, the projections 17 may be formed with barbs or teeth to more firmly engage in the timber lengths 19. The projections 17 each preferably lie in planes transverse to the longitudinal axis of the timber lengths 19. Other orientations of the projections, and the corresponding apertures 18 formed thereby, may be adopted if desired. The projections 17 may all be of one length or may be of varying lengths for particular purposes.

Referring to FIGS. 3 and 4, a modified construction of joining plate 12a is shown which is identical to that of the previous embodiment except that the base section 14a is provided with holes 25 instead of projections. The holes 25 enable fasteners, such as nails 20, to be used to secure the base section 14a to one side of the abutted timber lengths 19.

Further, the plate 12a is partially pre-bent, as shown in FIG. 4, to facilitate its engagement with the timber lengths 19 prior to the side sections 16 being bent to the aperture engaged position as illustrated in FIG. 3.

As will be seen in the drawings, the joining plate 12 and 12a of both embodiments have areas of metal on the base and side sections adjacent the corners which are free of holes 18 and 25, thus providing structural integrity of the plate along each corner which enhances plate ridigity and strength in use.

Further, the provision of such areas free of holes ensures that edges of the timber lengths joined are not split, and therefore weakened, by projections or nails positioned too close to the respective edges.

Figure 6:
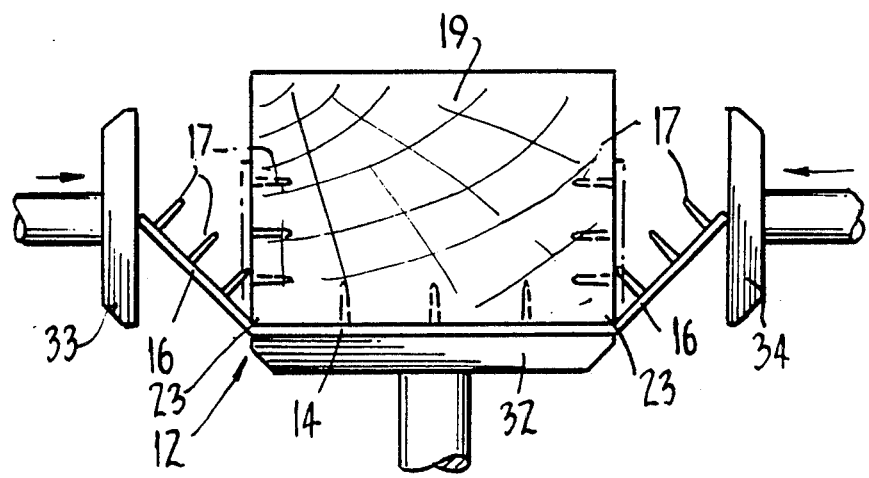
FIG. 6 is a view illustrating a second form of apparatus.
Figure 7:
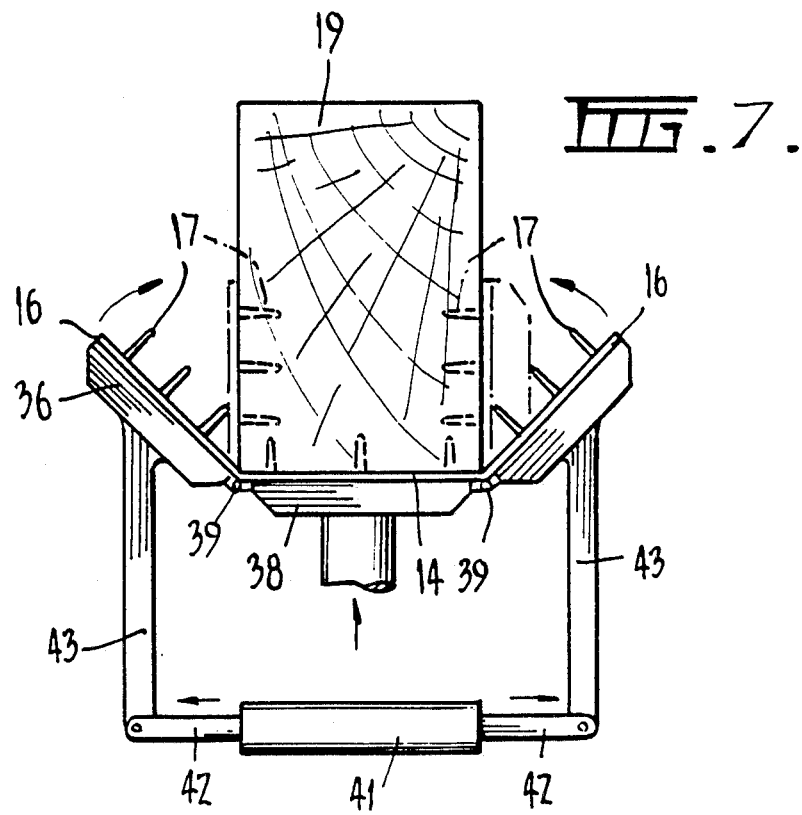
FIG. 7 is a view illustrating a third form of apparatus.

Referring to FIGS. 5 to 7, three different forms of apparatus for applying a joining plate of the invention to abutted timber lengths are illustrated.

FIG. 5 illustrates apparatus for applying the joining plate 12 to the timber lengths 19 using a press plate 21 and rollers 22. The joining plate 12 is initially formed as a planar plate with the plurality of projections 17 extending from one surface thereof. With the abutted end portions of the timber lengths 19 held together, the base section 14 of the plate 12 is engaged with side surfaces of the timber lengths 19. The press plate 21 which is hydraulically or pneumatically operated forces the base section 14 against the surfaces of the timber lengths 19 so that the projections 17 extending therefrom become embedded in the timber.

Form rollers 22 are then moved to engage the side sections 16 of the plate 12 and further movement of the form rollers 22 in the direction of the arrows shown in FIG. 5 causes the side sections 16 to bend about the edges 23 of the timber lengths 19. The side sections 16 are finally rolled into engagement with the opposed side surfaces 24 of the timber lengths 19 with the projections 17 extending from both side sections 16 embedded in the timber.

It is a feature of this embodiment of the invention that the movement of the form rollers 22 initially bends both side sections 16 in such a way that the ends of the projections closest to the edges 23 engage with the side surfaces 24 a distance from the edges 23 which substantially corresponds with the distance between the projection ends and the edges 23 before engagement of the base section 14 on the timber sections 19. In other words, when the projections 17 closest to the edges 23 are rolled into the timber those projections remain substantially perpendicular to the side sections 16 and the rolling action causes a neat penetration resulting in the projections being firmly embedded.

Two stages of the rolling of the side sections 16 into engagement with the end portions 19 are illustrated in dotted lines in FIG. 5.

FIG. 6 illustrates a second form of apparatus designed for use with a joining plate 12, having pre-bent side sections 16 and projections 17 extending from the base section 14 and the side sections 16. The end-abutted timber lengths 19 to be joined are supported by means (not shown) to enable the press plate 32 to press the base section 16 against a side surface of the timber length 19 so that the depending projections 17 penetrate the timber.

The opposed press plates 33 and 34 are then moved together to press the side sections 16 against the timber surfaces with the depending projections 17 penetrating the timber to be secured thereto. It has been found that, subject to timber density, the side sections 16 tend to bend about the points of engagement of those projections 17 nearest the corners 23 before those projections are driven into the timber. This tends to ensure that the projections are driven in a substantially perpendicular direction.

FIG. 7 shows apparatus similar to that of FIG. 5 except that, instead of form rollers to bend and secure the side sections 16, press plates 36 and 37 are pivoted to opposite side edges of the central press plate 38. The pivot connections 39 ensure that the press plates 36 and 37 move in the necessary arc to bend and secure the side sections 14 of the joining plate 12 in position. A hydraulic or pneumatic cylinder 41, piston rods 42 and levers 43 transmit the required motion and securing forces to the press plates 36 and 37.

Referring to FIG. 8 of the drawings, there is illustrated a spliced beam 26 having an upper chord 27 a lower chord 28 and intermediate timber sections 29. In the embodiment illustrated, the upper chord 27 is a single length of timber while the lower chord 28 is formed of a butt-jointed timber beam formed in accordance with any of the embodiments described with reference to FIGS. 1 to 7. The joining plate 12 firmly joins together the two portions of timber lengths forming the lower chord 28.

Figures 9, 10:
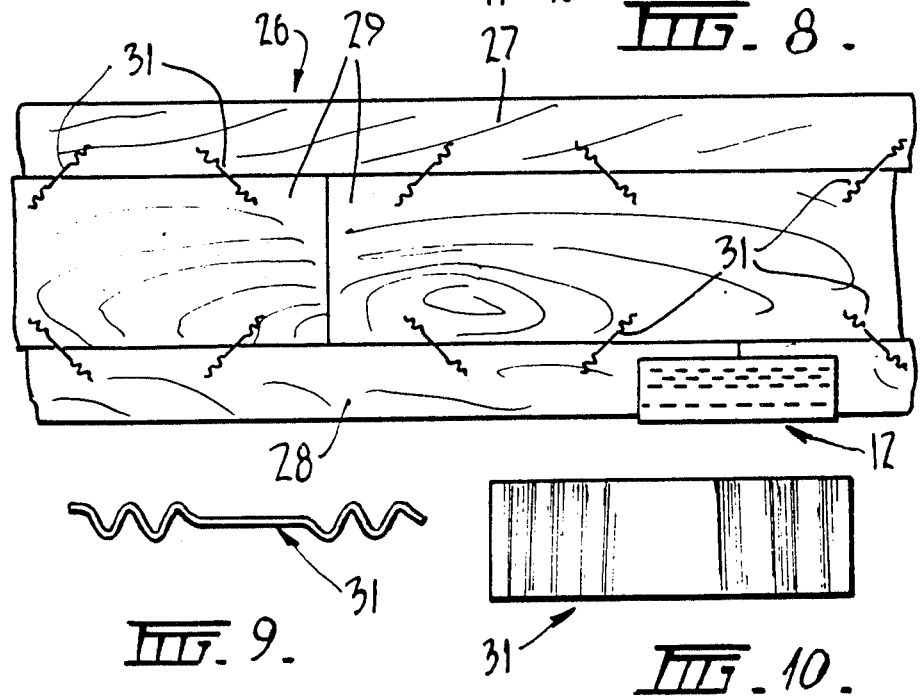
FIG. 9 is an end view of one form of fastener element.
FIG. 10 is a plan view of the element of FIG. 9.

The intermediate timber sections 29 are spliced to the upper and lower chords 27 and 28 by the use of fastener elements 31. The preferred fastener elements are illustrated in FIGS. 9 and 10 and comprise a variation of the known corrugated strip fasteners. As shown in FIGS. 9 and 10, the fastener elements of this embodiment have a central section free of corrugations and the corrugations at each end are not parallel but extend at an angle to each other of approximately 2°. The formation of the fastener in this manner means that, when the fastener is applied between lengths of timber, as shown in FIG. 8, the fibres along the engaged timber surfaces do not directly carry any load, the loading being applied by the corrugations at points spaced from the surface. Further, the biasing of the corrugations relative to each other causes the timber lengths to be drawn together when the fasteners are driven into the timber sections.

As shown in FIG. 8, the fastener elements 31 are driven into the timber sections 29 and the chords 27 and 28 so as to extend at an angle of approximately 45° to the plane of the engaged surfaces. Further, alternate fasteners extend in opposite directions to thereby distribute load applied to the beam between the chords 27 and 28 and the intermediate timber sections 29 without the fastener elements 31 being placed under pure shear forces. The angling of the fastener elements 31 means that the elements are placed in tension or compression and are thus able to more evenly distribute loads along the beam and, at the same time, prevent relative movement between the various beam parts. It is believed that the optimum angle for the fastener elements is 45°, as shown, but it is appreciaced that angles greater or less than 45° may be used and still retain the benefit of the angular disposition of the fasteners relative to the plane of the engaged surfaces.

It will also be appreciated that groups of fasteners may extend in one direction and alternate groups of fasteners extend in the opposite direction. However, it is preferred that alternate fasteners extend in opposite directions so that a beam may be constructed of any length and then cut to a desired length without concern as to the direction taken by the fastener elements 31.

Using the fastener elements and joining plates of the invention in the manner described, it is possible to produce a beam of relatively large cross-sectional area from relatively short timber lengths of smaller cross-sectional area, the intermediate timber sections 29, in particular, being formed of off-cuts and other short lengths which would otherwise go to waste.

It will also be appreciated that, although it is not essential, the intermediate timber sections 29 may be butt-joined in the manner described herein.

I claim:

1. A timber beam comprising two or more butt-joined timber sections of generally rectangular cross-section and a pair of joining plates spanning and forming the or each butt joint, each joining plate having a base part and integral opposed side parts forming a U-shaped plate, the base parts of the respective joining plates engaged with opposed surfaces of the timber sections with the side parts of the respective joining plates extending towards each other on the opposed side surfaces of the timber sections, each side part having a plurality of projections struck therefrom and embedded into the timber sections on both sides of the butt join and fastening means securing the opposed base parts to the timber sections, those portions of the base and side parts of each joining plate immediately adjacent the corners of the respective U-shaped plates being free of any projections or fastening means.

2. A timber beam according to claim 1 wherein said fastening means comprise projections struck from each base part and embedded in the timber sections.

3. A timber beam according to claim 1 wherein the number of projections on each side part amounts to not more than five per square inch of area of the side part.

4. A timber beam according to claim 1 wherein each said projection has a plane of orientation which extends substantially transversely of the beam.

5. A timber beam according to claim 1 wherein the projections extend in rows along the respective side parts which rows are spaced from the corners of the U-shaped plates.

6. A joining plate for butt-joining adjacent ends of timber lengths comprising a base section and opposed side sections which, in use, form a U-shaped plate, the base section and the side sections each having a plurality of projections struck therefrom and extending, in use, into the space defined by the base section and the side sections, those portions of the base and side sections immediately adjacent the corners of the U-shaped plate being free of any projections, the projections extending from the respective base and side sections substantially at right angles thereto and each said projection having a plane of orientation which extends substantially transversely of the length of the U-shaped plate, the number of projections on each side section amounting to not more than five per square inch of section area.

7. A joining plate according to claim 6 wherein said base and side sections are substantially co-planar and said projections extend in rows along the respective base and/or side sections, said rows being spaced from the intersecting lines between the base and respective side sections.

* * * * *